(12) United States Patent
Vasudev et al.

(10) Patent No.: US 12,325,129 B2
(45) Date of Patent: Jun. 10, 2025

(54) IMPLEMENTING AN AUTOMATED DATA CENTER ROBOTIC SYSTEM USING ARTIFICIAL INTELLIGENCE TECHNIQUES

(71) Applicant: Dell Products L.P., Round Rock, TX (US)

(72) Inventors: Rakshith Vasudev, Austin, TX (US); Yunfan Han, Austin, TX (US); Srinivas Varadharajan, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 342 days.

(21) Appl. No.: 17/961,890

(22) Filed: Oct. 7, 2022

(65) Prior Publication Data

US 2024/0116176 A1    Apr. 11, 2024

(51) Int. Cl.
*B25J 9/16* (2006.01)
*B25J 19/02* (2006.01)

(52) U.S. Cl.
CPC ........... *B25J 9/161* (2013.01); *B25J 9/163* (2013.01); *B25J 9/1653* (2013.01); *B25J 9/1664* (2013.01); *B25J 9/1679* (2013.01); *B25J 19/023* (2013.01)

(58) Field of Classification Search
CPC . B25J 9/161; B25J 9/163; B25J 9/1653; B25J 9/1664; B25J 9/1679; B25J 19/023
See application file for complete search history.

(56) References Cited

U.S. PATENT DOCUMENTS

| | | | |
|---|---|---|---|
| 2018/0319014 A1* | 11/2018 | Dukatz | G05D 1/0016 |
| 2019/0111574 A1* | 4/2019 | Gold | B25J 15/04 |
| 2019/0387291 A1* | 12/2019 | Adiletta | G06F 9/30036 |
| 2021/0086364 A1* | 3/2021 | Handa | B25J 13/08 |

(Continued)

FOREIGN PATENT DOCUMENTS

CN    113459122 A  * 10/2021

OTHER PUBLICATIONS

Towards Data Center Self Diagnosis Using a Mobile Robot (Year: 2011).*

(Continued)

*Primary Examiner* — Kyle T Johnson
(74) *Attorney, Agent, or Firm* — Ryan, Mason & Lewis, LLP (57) ABSTRACT

Methods, apparatus, and processor-readable storage media for implementing an automated data center robotic system using artificial intelligence techniques are provided herein. An example computer-implemented method includes obtaining one or more items of data, external to an automated robotic system, from a data center environment; determining one or more automated operations to be carried out by the automated robotic system within the data center environment by processing at least a portion of the one or more items of data and one or more user-provided commands using at least one artificial intelligence-based inference engine; generating one or more instructions related to carrying out the one or more automated operations within the data center environment; and performing at least a portion of the one or more automated operations within the data center environment based at least in part on the one or more instructions.

20 Claims, 6 Drawing Sheets

(56) References Cited

U.S. PATENT DOCUMENTS

| | | | | |
|---|---|---|---|---|
| 2021/0146531 A1* | 5/2021 | Tremblay | ............... | G06N 3/006 |
| 2021/0158162 A1* | 5/2021 | Hafner | ................... | G06N 3/006 |
| 2021/0362328 A1* | 11/2021 | Kolluri | .................... | B25J 13/06 |
| 2022/0001549 A1* | 1/2022 | Vadayadiyil Raveendran | ............ | |
| | | | | G06Q 10/06 |
| 2023/0107460 A1* | 4/2023 | Carvahlo | ............... | G06N 3/092 |
| | | | | 706/23 |
| 2023/0256593 A1* | 8/2023 | Zolna | ....................... | B25J 9/163 |
| | | | | 706/21 |
| 2023/0415336 A1* | 12/2023 | Ganju | ...................... | B25J 9/163 |
| 2024/0042601 A1* | 2/2024 | Iqbal | ...................... | B25J 9/1697 |
| 2024/0061388 A1* | 2/2024 | Ganju | ................ | G05B 23/0243 |
| 2024/0116176 A1* | 4/2024 | Vasudev | ................ | B25J 9/1653 |

OTHER PUBLICATIONS

A_novel_cloud_based_service_robotics_application_to_data_center (Year: 2016).*

CN-113459122-A translation (Year: 2021).*

* cited by examiner

IMPLEMENTING AN AUTOMATED DATA CENTER ROBOTIC SYSTEM USING ARTIFICIAL INTELLIGENCE TECHNIQUES

FIELD

The field relates generally to information processing systems, and more particularly to techniques for managing data center resources using such systems.

BACKGROUND

Managing data centers often includes performing certain tasks on a periodic and/or regular basis. Such tasks can include, for example, new system deployment, server and/or component replacement, component upgrade, cable modification, etc. However, conventional data center management techniques commonly require laborious and repetitive processes that can be time- and resource-intensive, as well as error-prone.

SUMMARY

Illustrative embodiments of the disclosure provide techniques for implementing an automated data center robotic system using artificial intelligence techniques. An exemplary computer-implemented method includes obtaining one or more items of data, external to an automated robotic system, from a data center environment. The method also includes determining one or more automated operations to be carried out by the automated robotic system within the data center environment by processing at least a portion of the one or more items of data and one or more user-provided commands using at least one artificial intelligence-based inference engine. Further, the method includes generating one or more instructions related to carrying out the one or more automated operations within the data center environment, and performing at least a portion of the one or more automated operations within the data center environment based at least in part on the one or more instructions.

Illustrative embodiments can provide significant advantages relative to conventional data center management techniques. For example, problems associated with laborious, resource-intensive, and error-prone processes are overcome in one or more embodiments through automatically performing various operations within data centers via implementation of an artificial intelligence-based automated robotic system.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
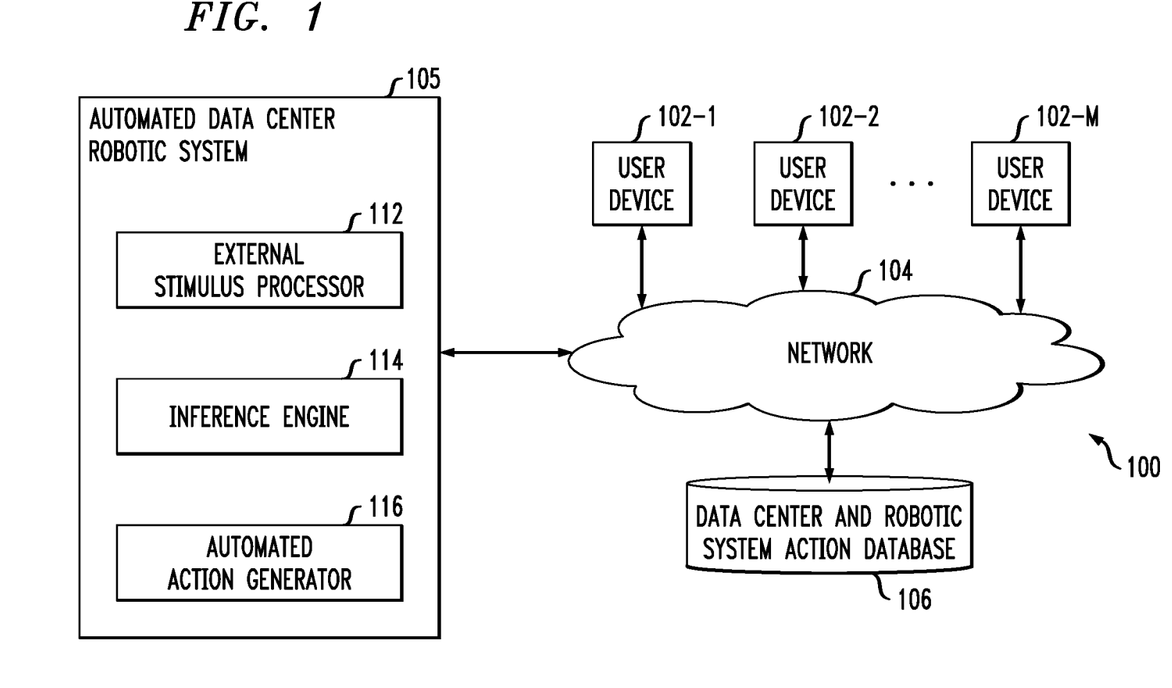
FIG. 1 shows an information processing system configured for implementing an automated data center robotic system in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated data center robotic system 105.

The user devices 102 may comprise, for example, mobile telephones, laptop computers, tablet computers, desktop computers or other types of computing devices. In one or more embodiments, user devices 102 can include servers, for example, servers in a data center. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated data center robotic system 105 can have an associated data center and robotic system action database 106 configured to store data pertaining to various data centers and/or components thereof, as well as data pertaining to one or more automated data center robotic systems and/or actions carried out thereby.

The data center and robotic system action database 106 in the present embodiment is implemented using one or more storage systems associated with automated data center robotic system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated data center robotic system 105 are one or more input-output devices, which illustratively comprise keyboards, displays or other types of input-output devices in any combination. Such input-output devices can be used, for example, to support one or more user interfaces to automated data center robotic system 105, as well as to support communication between automated data center robotic system 105 and other related systems and devices not explicitly shown.

Additionally, automated data center robotic system 105 in the FIG. 1 embodiment is assumed to be implemented using at least one processing device. Each such processing device generally comprises at least one processor and an associated memory, and implements one or more functional modules for controlling certain features of automated data center robotic system 105.

More particularly, automated data center robotic system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media. The network interface allows automated data center robotic system 105 to communicate over the network 104 with the user devices 102, and illustratively comprises one or more conventional transceivers.

The automated data center robotic system 105 further comprises external stimulus processor 112, inference engine 114, and automated action generator 116.

It is to be appreciated that this particular arrangement of elements 112, 114 and 116 illustrated in the automated data center robotic system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for implementing an automated data center robotic system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated data center robotic system 105 and data center and robotic system action database 106 can be on and/or part of the same processing platform.

An exemplary process utilizing elements 112, 114 and 116 of an example automated data center robotic system 105 in computer network 100 will be described in more detail with reference to the flow diagram of FIG. 6.

Accordingly, at least one embodiment includes generating and/or implementing an automated data center robotic system (also referred to herein simply as robotic system) to remotely manage data center resources (e.g., rack and stack servers in a data center). Such an embodiment includes configuring the robotic system to navigate one or more data center environments and automatically carry out one or more processes such as, for example, replacing servers and/or components thereof, installing new servers and/or components thereof, etc.

Additionally, one or more embodiments include employing at least one virtual environment to train (e.g., via online learning) such a robotic system. In at least one embodiment, such a virtual environment can include at least one human agent (e.g., a human agent on the backend to complete one or more processes). Further, one or more embodiments includes implementing at least one robotic system portal that can synchronize multiple robotic systems operating in one or more data center environments.

As also detailed herein, at least one embodiment includes configuring at least one robotic system to learn and/or understand one or more data center environments such that the at least one robotic system can recognize various data center components (e.g., racks, compute servers, peripherals, tools, cables, etc.) and perform various actions and/or operations. Such actions and/or operations can include, for example, implementing servers (also referred to herein as racking and stacking servers) to fit customizable needs of the given end user without a human being present in the data center.

By way of further example, such actions and/or operations can include recognizing racks and servers in a data center, moving and/or lifting servers from one or more given racks and/or boxes and placing such servers on one or more work surfaces (e.g., a supportable worktable). Such actions and/or operations can also include opening a given server and recognizing one or more slots therein that need hardware addition and/or removal, removing and/or pulling out the necessary hardware piece(s) to match the expected workload(s) as specified by given instructions, and inserting replacement components (e.g., CPUs, accelerators, memory (e.g., dual in-line memory modules (DIMMs)) storage components, networking components, etc.) into the appropriate slot(s). Further, such actions and/or operations can also include closing the relevant casing(s) of the given server(s), racking and/or un-racking the given server(s) to one or more desired rack locations, plugging the server(s) into the appropriate power socket(s), and connecting the relevant network and/or other cables. Additionally, such actions and/or operations can include powering on or off the server(s), and notifying associated systems and/or software (e.g., an out-of-band management platform and/or other integrated software) that the server(s) is/are back on as requested by the end user(s).

Figure 2:
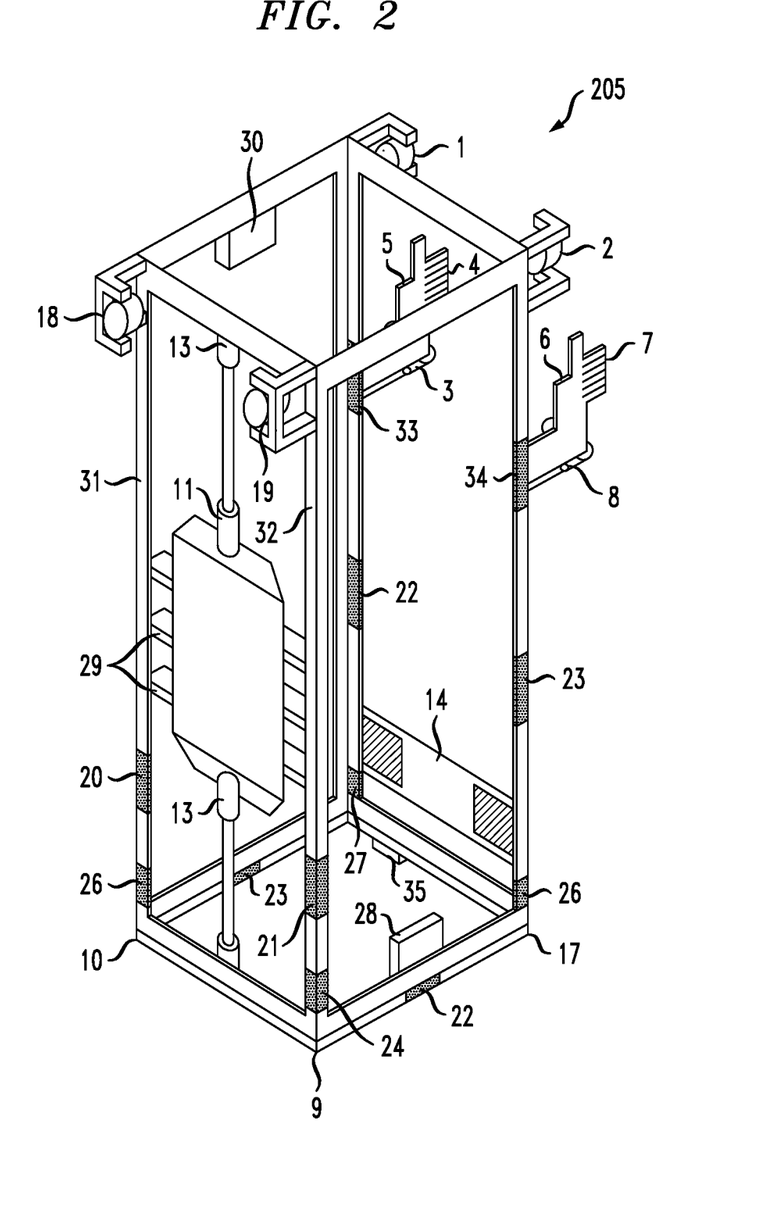
FIG. 2 shows a schematic diagram of an example automated data center robotic system in an illustrative embodiment.

FIG. 2 shows a schematic diagram of an example automated data center robotic system in an illustrative embodiment. By way of illustration, FIG. 2 depicts automated data center robotic system 205, which includes cameras 1, 2, 18 and 19 (which can, in one or more embodiments, represent at least a portion of an external stimulus processor such as depicted as element 112 in FIG. 1), as well as hydraulic motion components 3 and 8 (which can, in one or more embodiments, represent at least a portion of an automated action generator such as depicted as element 116 in FIG. 1) for the arms of the automated data center robotic system 205. These arms have finger components 4, 5, 6 and 7 (which can, in one or more embodiments, represent at least a portion of an automated action generator such as depicted as element 116 in FIG. 1) that allow for manipulation and dexterity. Additionally, in one or more embodiments, the arms are extensible and vertically moveable, powered by hydraulic components 33 and 34 (which can, in one or more embodiments, represent at least a portion of an automated action generator such as depicted as element 116 in FIG. 1).

As also depicted in FIG. 2, automated data center robotic system 205 includes sensors 20, 21, 22 and 23 (which can, in one or more embodiments, represent at least a portion of an external stimulus processor such as depicted as element 112 in FIG. 1) used for perceiving the environment and/or external stimulus. Further, inference engine 14 represents a processing engine which makes decisions and builds strategies to execute the decisions. In one or more embodiments, inference engine 14 includes an on-board compute component (e.g., an integrated circuit such as a system-on-a-chip (SoC)). Additionally, automated data center robotic system 205 also includes hydraulic shock absorbers 24, 26 and 27 to deal with and absorb motion-related shocks. Undermount motors 10, 9 and 17, in conjunction with one or more motorized wheels 35 (which can, in one or more embodiments, represent at least a portion of an automated action generator such as depicted as element 116 in FIG. 1), aid to enable motion of automated data center robotic system 205 (e.g., in conjunction with one or more wheels), and shelving 29 is configured to hold servers and/or components thereof with the aid of suspended hydraulic components 11 and 13 and belts and motor 30. Also, guard rails 31 and 32 aid the lifting of servers, and battery location 28 is positioned on a side door. In at least one embodiment, a battery source provides for the automated data center robotic system 205 to be self-chargeable (e.g., via positioning battery location 28 proximate to an outlet).

Accordingly, one or more embodiments include implementing a robotic system that has onboard compute capabilities, software, and hardware accessories such as, for example, cameras, sensing systems, speakers, motors, belts, suspensions, etc., and wherein such a robotic system can be actively connected to the Internet. As also noted above and further detailed herein, implementing such a robotic system can include implementing an associated internal portal (also referred to herein as a robotic system portal) that synchronizes with the given robotic system and provides and/or monitors details pertaining to the health of the robotic system, camera views, detections, decisions, battery status information, etc.

Additionally, such a robotic system is capable of recognizing various hardware components, cables and/or wires, tools (e.g., screwdrivers, screws, etc.), fans, servers, racks, GPUs, DIMMs, CPUs, work surfaces, etc., wherein such recognition ability can be based at least in part (although not limited to) relevant installation procedures and manuals. Also, as noted herein, such a robotic system can learn and/or recognize one or more data center environments and/or similar or related environments wherein environmental factors such as humans, racks, lifting tools, carton boxes, cables, etc. can be well navigated and local mapping can be calibrated into the robotic system. In one or more embodiments, such a robotic system can include pretrained sub-systems including, for example, one or more perception sub-systems, one or more localization sub-systems, one or more pose estimation sub-systems, one or more simultaneous localization and mapping (SLAM) sub-systems, and one or more three-dimensional (3D) reconstruction sub-systems. Further, in at least one embodiment, various parts and/or components of the robotic system are flexible so as to facilitate movement and/or particular actions.

As detailed above in connection with FIG. 1, in one or more embodiments, an automated data center robotic system includes an external stimulus processor, an inference engine, and an automated action generator.

The external stimulus processor monitors and processes stimuli and/or related data from the given data center environment (e.g., the actual data center and one or more edge locations where the robotic system can be implemented). By way merely of illustration, such external stimuli might include, for example, people walking or moving in the data center, obstacles within the data center (e.g., forklifts, server components, wires), rack doors (e.g., open rack doors potentially blocking the robotic system's path), servers to be unmounted from one or more racks, etc. The processing of such data can be used, as further detailed herein, by the robotic system in connection with carrying out and/or executing various automated actions.

Relatedly, an automated action generator can include one or more components of the robotic system. For example, the automated action generator can include at least one actuator of the robotic system that is capable of enforcing the inference engine's guiding force(s). Additionally, the automated action generator facilitates and/or enables execution of various systems and/or sub-systems, such that the robotic system can take autonomous actions to complete one or more objectives, for example, as provided by a user command portal and/or a voice command. Such automated actions can include, merely by way of example, initiating one or more motors of the robotic system, initiating a lift motion by the robotic system, initiating forward, backward, or lateral movement by the robotic system, changing and/or replacing one or more data center components (e.g., hardware, servers, etc.) via initiating one or more mechanical labors of the robotic system (e.g., rotation, etc.).

In at least one embodiment, in connection with the automated action generator as well as the external stimulus processor, the inference engine makes various operations of the robotic system possible. In one or more embodiments, the inference engine can include, as further detailed herein, one or more artificial intelligence techniques. Such artificial intelligence techniques can analyze data captured and/or processed by the external stimulus processor. For example, one element of the external stimulus processor can include at least one viewer component. A viewer component can be included in connection with at least one portion of the robotic system (e.g., a section on the front of the robotic system) that carries and/or encompasses at least one camera module for viewing the environment. A viewer component can also include hardware used for perception processes such as, for example, one or more types of sensors (e.g., light detection and ranging (LiDAR) sensors, cameras, microphones, etc.). Such a component of the external stimulus processor can, for example, feed an environmental-based livestream of data and/or content to the inference engine for analysis.

Figure 3:
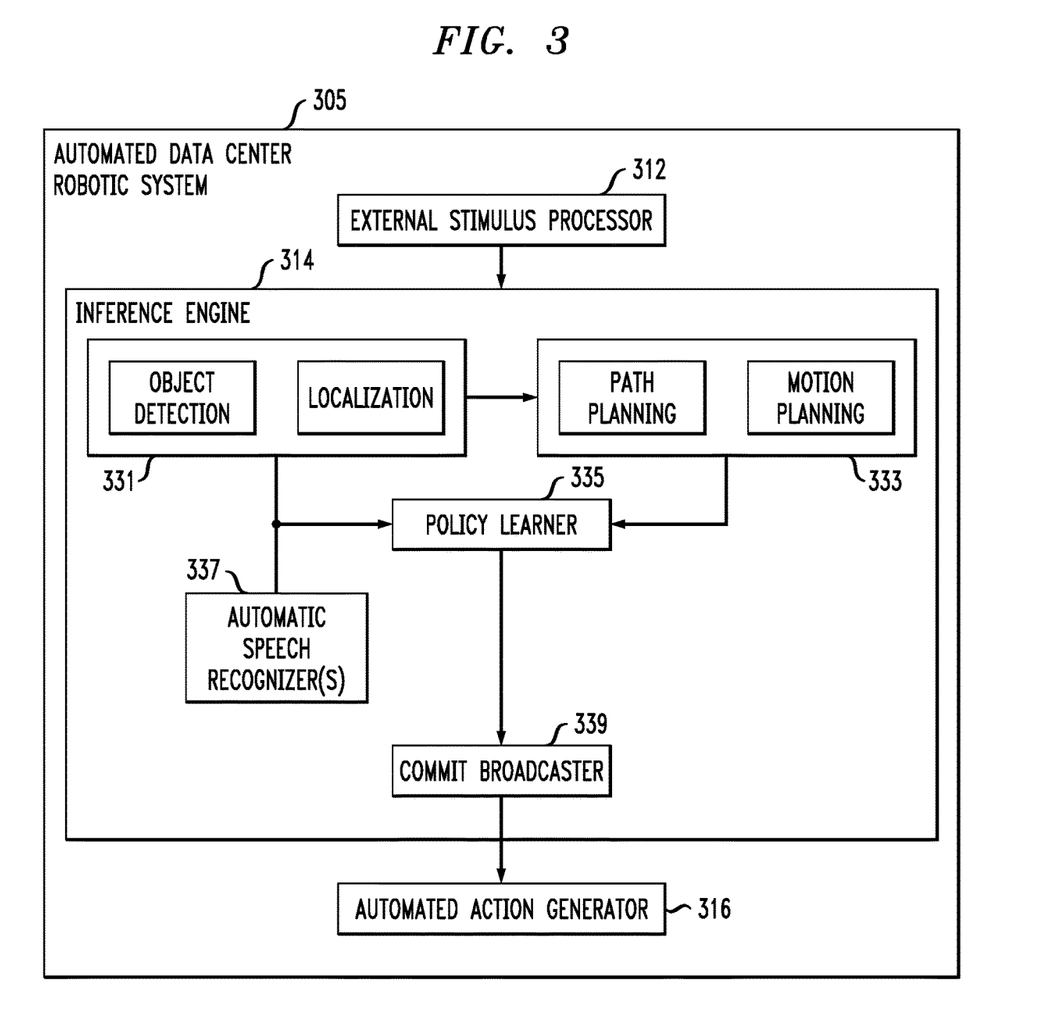
FIG. 3 shows example architecture of an inference engine in an illustrative embodiment.

FIG. 3 shows example architecture of an inference engine in an illustrative embodiment. By way of illustration, FIG. 3 depicts, within automated data center robotic system 305, inference engine 314, which receives and processes data provided by external stimulus processor 312 (e.g., one or more sensors), and outputs data and/or instructions to automated action generator 316. As further detailed in connection with FIG. 3, inference engine 314 includes one or more decision enabling units, one or more deep learning models, etc., to enable determination of multiple inferences and planning processes.

Specifically, FIG. 3 depicts various models included in inference engine 314. Such models can include model 331, which carries out object detection and localization tasks, model 333, which carries out path planning and motion planning tasks, model 335, which includes at least one policy learner, model 337, which includes one or more automatic speech recognizers (ASRs), and model 339, which includes one or more commit broadcasters. By way of illustration, model 331 can include employing at least one single shot detector with an EfficientNet-b3 backbone, model 333 can include employing one or more visual SLAM models, model 335 can include employing one or more reinforcement learning techniques and/or at least one proximal policy optimization algorithm, model 337 can include employing at least one recurrent neural network transducer (RNN-T) model, and model 339 can include employing at least one Kafka-based streaming engine that carries out Kafka production while also converting one or more decision outputs (e.g., inference engine determinations) into one or more electrical signals to enable one or more subsequent actions by the automated data center robotic system 305 (e.g., via automated action generator 316).

By way merely of illustration, consider the following example use case implementing one or more embodiments, wherein a GPU needs to be installed to a new server node. In such an example use case, and in accordance with the example embodiment depicted in FIG. 3, the automated data center robotic system 305 receives at least one corresponding command from a user customer portal and/or a voice command from a user. Additionally, external stimulus processor 312 (e.g., one or more input sensors) on the automated data center robotic system 305 perceives one or more items of external stimulus (e.g., light detection and ranging (Lidar) data points, data and/or a feed from one or more cameras, etc.), which are then sent to model 331 of inference engine 314 for object detection and localization. Based at least in part on the processing of such data by model 331, output is provided to and processed by model 333, which generates a path plan recommendation that factors in one or more parameters (e.g., safety parameters) to initiate a corresponding motion plan, while also having a strategy mapping of the sequence of steps needed to execute one or more expected outcomes.

Such outputs generated by model 333 are sent to and processed by the policy learner in connection with model 335, which assess if there are one or more factors (from the model 333 outputs) that need improvement. By way merely of illustration, such factors can include, for example, one or more policies that the robotic system uses to engage with one or more environments, wherein such policies describe at least one mechanism and/or at least one strategy (e.g., optimal path planning, collision avoidance, automated battery charging, server unmounting and remounting, etc.) that the robotic system takes to reach one or more expected goals.

Also, in at least one embodiment, one or more learned outcomes are sent to the policy learner before and after the path planning procedure is carried out by model 333. In such an embodiment, and as further detailed herein, the policy learner remains synchronized with the robotic system portal and optimizes one or more strategies for the automated data center robotic system 305.

Once the automated data center robotic system 305 is ready in connection with the tasks(s) in question, the commit broadcaster of model 339 is initiated to provide instructions to automated action generator 316 to execute the one or more outcomes. In this example use case, such execution can include identifying the given server (within the data center environment), moving the server to a workbench or similar space, removing the server case, identifying the server type, identifying the GPU slot (e.g., PCI express (PCIE) versus SXM), installing the GPU, closing the server case, moving the server to its intended destination, and plugging the server in, including all relevant cables.

As also detailed herein, one or more embodiments include the use and/or implementation of at least one user portal and at least one robotic system portal. In such an embodiment, a user portal can be used by one or more users to provide commands to one or more robotic systems and track progress of the tasks being executed by one or more robotic systems. Robotic system portals are further detailed herein and below in connection with FIG. 4 and FIG. 5.

Figure 4:
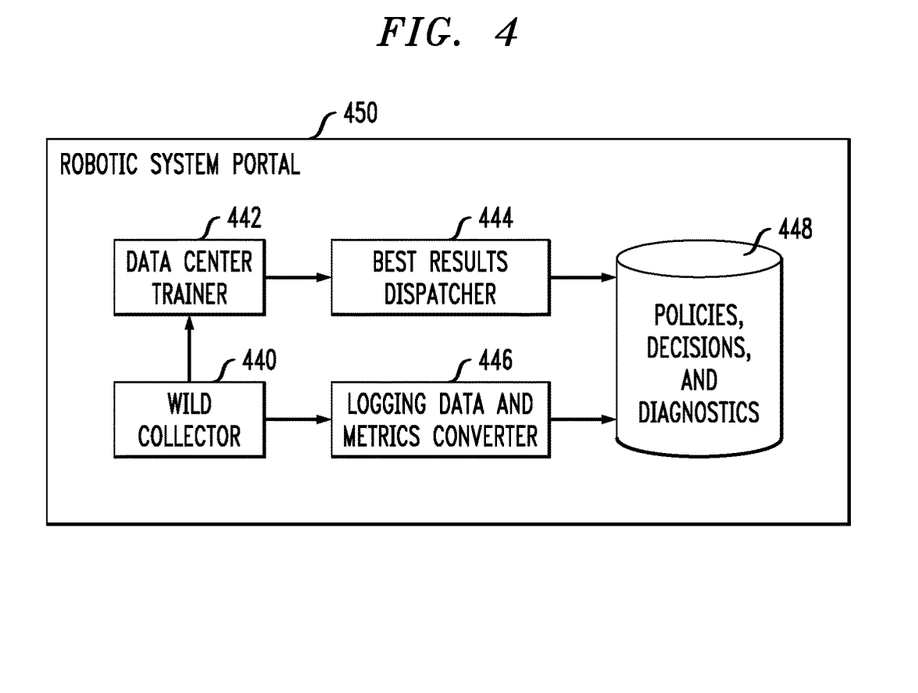
FIG. 4 shows example architecture of a robotic system portal in an illustrative embodiment.

FIG. 4 shows example architecture of a robotic system portal in an illustrative embodiment. By way of illustration, robotic system portal 450 is a system that involves continuous upgrades and which pushes one or more updates to one or more robotic systems. In one or more embodiments, robotic system portal 450 includes incorporating and/or processing multiple policies, robotic system behavior data, and consistent reinforcement of policy planning. Policies and training provided for recommended behavior of a given robotic system can be based at least in part on the expected outcomes as suggested by and/or determined by at least one inference engine (as detailed above and herein).

Specifically, as depicted in FIG. 4, robotic system portal 450 includes a data center trainer 442, which includes a virtual training environment that has one or more physics-based properties wherein elements such as, for example, racks, workbenches, servers, screws, server hardware (e.g., GPUs, CPUs, etc.), etc., can be placed in the environment similar to a given real world data center environment. For example, if a given server is placed 98% outside of the edge of a given workbench, the server falls over to the ground and the robotic system receives a negative reward. Accordingly, in one or more embodiments, data center trainer includes at least one simulation engine, and customization of various behaviors can be encoded in the simulation engine to fit one or more particular data centers and/or edge devices.

Accordingly, the data center trainer 442, in one or more embodiments, can be thought of as a training room with realistic physics dynamics and acceptable behavior modeled for the robotic system(s) to make mistakes and learn from the rewards provided. In such an embodiment, a robotic system can learn one or more policies because the data center trainer 442, in collaboration with at least one human agent in the loop, can render the given environment more realistic to use for training purposes. The rewards that the robotic system receives can be based, for example, at least in part on the behavior(s) defined by the at least one human agent in the loop. For instance, the human agent can define one or more acceptable ways that the robotic system should perform a given task, and the closer that the robotic system gets to the defined behavior(s), the higher the score that the robotic system receives.

As also depicted in FIG. 4, wild collector 440 is responsible for collecting event-related data that the robotic system produces, and providing at least a portion of such data to the data center trainer 442. Also, best results dispatcher 444 includes a layer to enable filtering out data that do not represent useful outcomes and/or the best outcomes from data center trainer 442. Additionally, logging data and metrics converter 446 converts raw logs into one or more useful metrics that policies, decisions and diagnostics database 448 can archive. Further, policies, decisions and diagnostics database 448 contains data pertaining to the most optimal decisions, policies, and diagnostics that are consumed by the deployed robotic system.

Figure 5:
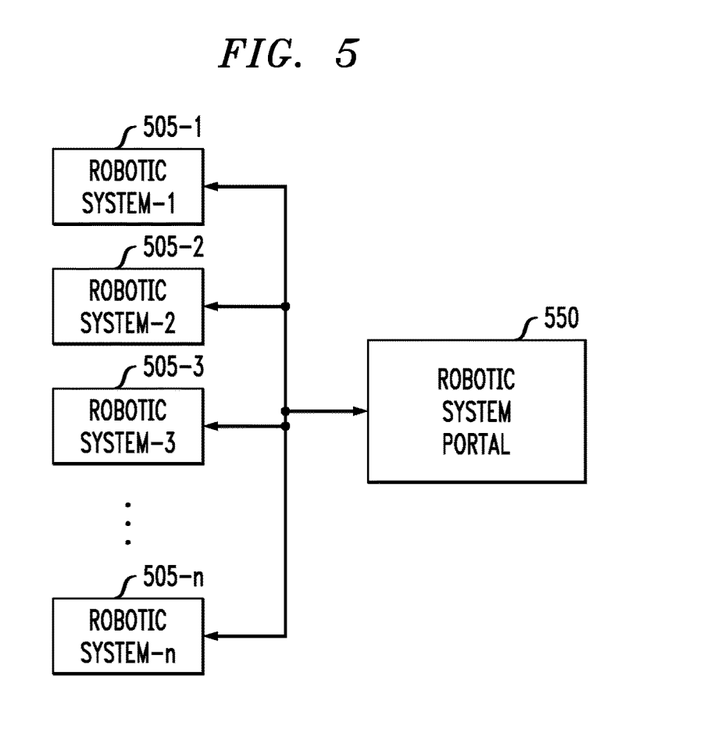
FIG. 5 shows a synchronization workflow between robotic systems and a robotic system portal in an illustrative embodiment.

FIG. 5 shows a synchronization workflow between robotic systems and a robotic system portal in an illustrative embodiment. By way of illustration, FIG. 5 depicts robotic system portal 550 as well as robotic system 505-1, robotic system 505-2, robotic system 505-3, . . . robotic system 505-n (collectively referred to herein as robotic systems 505). Accordingly, in one or more embodiments, robotic system portal 550 includes an environment that is continuously updated and/or reiterated with new data points provided by one or more of robotic systems 505 during respective operations and/or performance. Such updates can then be propagated by robotic system portal 550 to one or more of the other robotic systems such that, for example, all of the robotic systems 505 have similar knowledge and intelligence to operate in a successful manner.

Also, in at least one embodiment, in the event that a given one of the robotic systems 505 operates in a completely new terrain and/or environment and is posed with set of one or more operational challenges, the robotic system's objective function is modified to minimize uncertainty, minimize uniqueness and/or reduce the operational thresholds for taking unclear actions. In such an embodiment, the given robotic system can reduce uncertainty by issuing queries, to one or more other system elements and/or one or more users, which can facilitate providing additional clarity to the robotic system's behavior such that corresponding actions are not receiving negative rewards, such as given, for example, by Equation (1) below:

$$\text{goal: } \max_{\pi} E\left[\sum_{t=0}^{H} \gamma^t R(S_t, A_t, S_{t+1})|\pi\right] \quad (1)$$

As such, in at least one example embodiment, a goal of the robotic system can include attempting to increase and/or maximize the expected discounted rewards over a particular time horizon H by taking actions that meet one or more constraints. Accordingly, a goal of Equation (1) includes maximizing the expected discounted reward (E), wherein $S_t$ represents the state at time instant t, $A_t$ represents the action associated with time instant t, $S_{t+1}$ represents the state at time instant t+1, H represents the horizon, $\gamma$ represents the discount factor that describes how much weight is to be given for short term versus long term outcomes (e.g., 0.999 is an example long term weight, and 0.9 is an example short term weight), R represents the reward, and $\pi$ represents the policy applied.

Accordingly, in one or more embodiments, a robotic system portal (e.g., portal 550) can include an uncertainty reducer component, which can be configured to output a pretrained uncertainty reducer to one or more robotic systems, and which can also be under and/or subject to continual learning techniques. Such a component can include one or more question answering models that aim to learn from asking questions about one or more operational and/or environmental aspects that are unclear, such as given, for example, by Equation (2) below:

$$\text{goal: } \max_{\pi} E\left[\sum_{t=0}^{H} \gamma^t C(S_t, A_t, S_{t+1})|\pi\right] \quad (2)$$

wherein C represents the clarity of the given outcome.

The answers can help to build at least one knowledge tree and impart intelligence to one or more robotic systems, wherein such intelligence can also be deployed to one or more additional robotic systems to aid with improved decision making. Additionally, such intelligence can be supplemented and/or added to by individual robotic systems by continually monitoring for new information (e.g., information pertaining to hardware products, processes, etc.) from one or more data sources (e.g., Internet sources such as product listing descriptions) related to performing one or more data center-related operations and/or solving one or more data center-related problems.

As detailed herein, one or more embodiments include implementing online learning techniques, wherein on a given basis (e.g., continuously), the portal receives reference data points pertaining to at least one deployment environment and/or decisions made. Such learning can result in pushing one or more updates including, for example, learned policies, models, knowledge, etc.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s)

disclosed herein to abstract concepts; instead, each model herein has a practical application in a processing device in the form of stored executable instructions and data that implement the model using the processing device.

Figure 6:
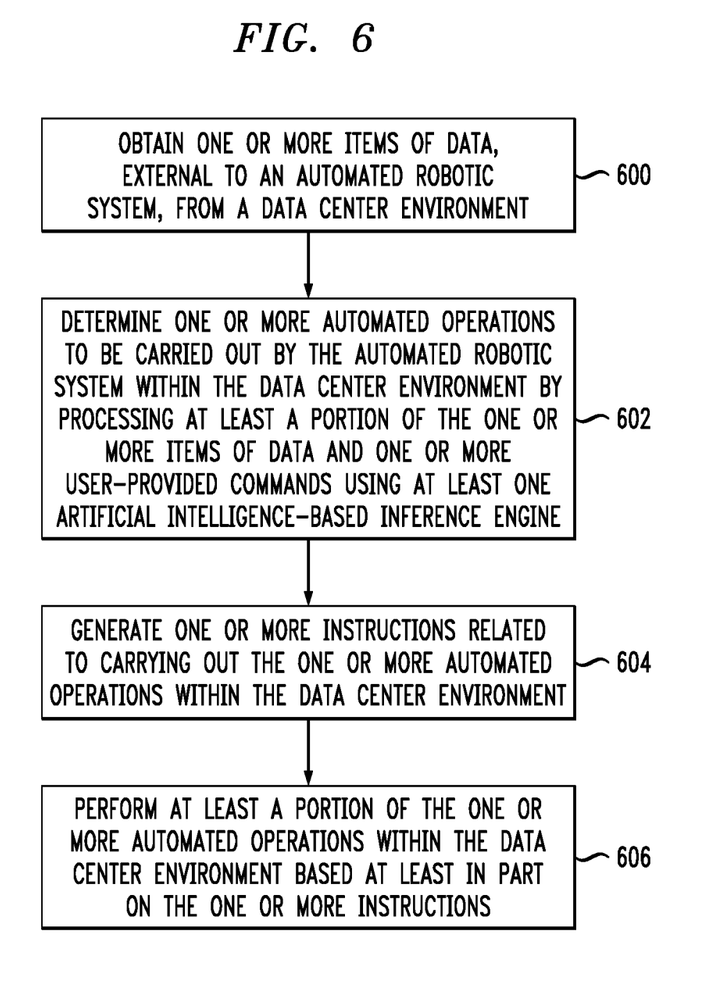
FIG. 6 is a flow diagram of a process for implementing an automated data center robotic system in an illustrative embodiment.

FIG. 6 is a flow diagram of a process for implementing an automated data center robotic system in an illustrative embodiment. It is to be understood that this particular process is only an example, and additional or alternative processes can be carried out in other embodiments.

In this embodiment, the process includes steps 600 through 606. These steps are assumed to be performed by automated data center robotic system 105 utilizing its elements 112, 114 and 116.

Step 600 includes obtaining one or more items of data, external to an automated robotic system, from a data center environment. In at least one embodiment, obtaining one or more items of data includes automatically identifying one or more data center components within the data center environment. Additionally, obtaining one or more items of data can include capturing data from the data center environment using at least one of one or more cameras on the automated robotic system and one or more sensors on the automated robotic system.

Step 602 includes determining one or more automated operations to be carried out by the automated robotic system within the data center environment by processing at least a portion of the one or more items of data and one or more user-provided commands using at least one artificial intelligence-based inference engine. In one or more embodiments, determining one or more automated operations to be carried out by the automated robotic system within the data center environment comprises processing at least a portion of the one or more items of data using one or more of at least one single shot detector, one or more simultaneous localization and mapping models, one or more reinforcement learning techniques, at least one proximal policy optimization algorithm, at least one recurrent neural network transducer model, and at least one streaming engine. Also, the one or more automated operations to be carried out by the automated robotic system within the data center environment can include, for example, one or more automated operations related to manipulating at least one of one or more servers within the data center environment and one or more server components within the data center environment.

Step 604 includes generating one or more instructions related to carrying out the one or more automated operations within the data center environment. In at least one embodiment, generating one or more instructions includes converting data pertaining to the one or more automated operations determined to be carried out by the automated robotic system into one or more electrical signals related to one or more physical components of the automated robotic system.

Step 606 includes performing at least a portion of the one or more automated operations within the data center environment based at least in part on the one or more instructions. In one or more embodiments, performing at least a portion of the one or more automated operations includes implementing one or more arms of the automated robotic system, wherein at least a portion of the one or more arms are one or more of extensible, vertically moveable, horizontally moveable, and engaged using one or more hydraulic components. Additionally or alternatively, performing at least a portion of the one or more automated operations can include initiating movement of the automated robotic system by engaging at least one motor of the automated robotic system in conjunction with one or more wheels of the automated robotic system. In such an embodiment, initiating movement of the automated robotic system can include initiating movement of the automated robotic system in accordance with a motion plan generated by the at least one artificial intelligence-based inference engine in connection with determining the one or more automated operations to be carried out within the data center environment.

In one or more embodiments, the techniques depicted in FIG. 6 are performed by the automated robotic system comprising at least one processing device comprising a processor coupled to a memory. Additionally, the techniques depicted in FIG. 6 can include automatically training the at least one artificial intelligence-based inference engine. In one or more embodiments, automatically training the at least one artificial intelligence-based inference engine is based at least in part on feedback related to the performed at least a portion of the one or more automated operations within the data center environment. Additionally or alternatively, automatically training the at least one artificial intelligence-based inference engine can be based at least in part on feedback related to one or more automated operations carried out within at least one virtual environment related to the data center environment. Further, in at least one embodiment, automatically training the at least one artificial intelligence-based inference engine is based at least in part on data related to one or more automated operations carried out by at least one additional automated robotic system within at least one additional data center environment, wherein the automated robotic system and the at least one additional automated robotic system are connected via at least one robotic system portal.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement one or more automated data center robotic systems using artificial intelligence techniques. These and other embodiments can effectively overcome problems associated with laborious, resource-intensive, and error-prone processes associated with conventional techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
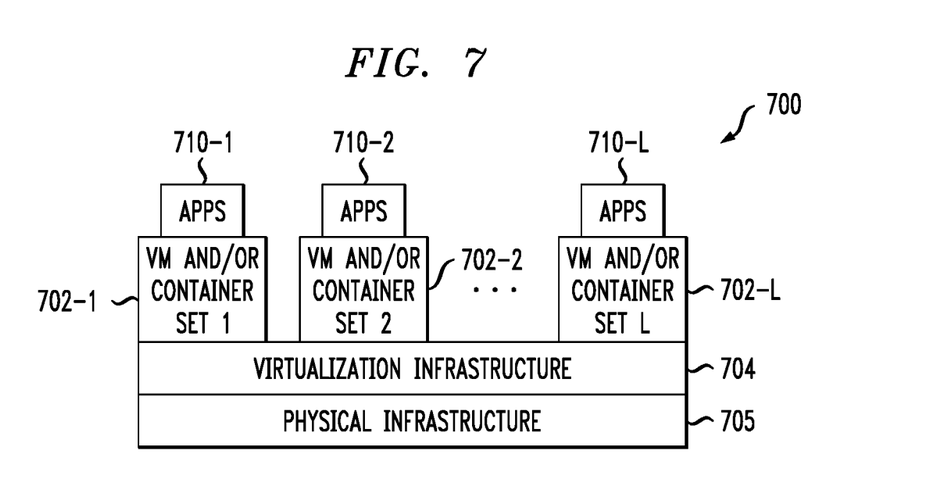
FIGS. 7 and 8 show examples of processing platforms that may be utilized to implement at least a portion of an information processing system in illustrative embodiments.
Figure 8:
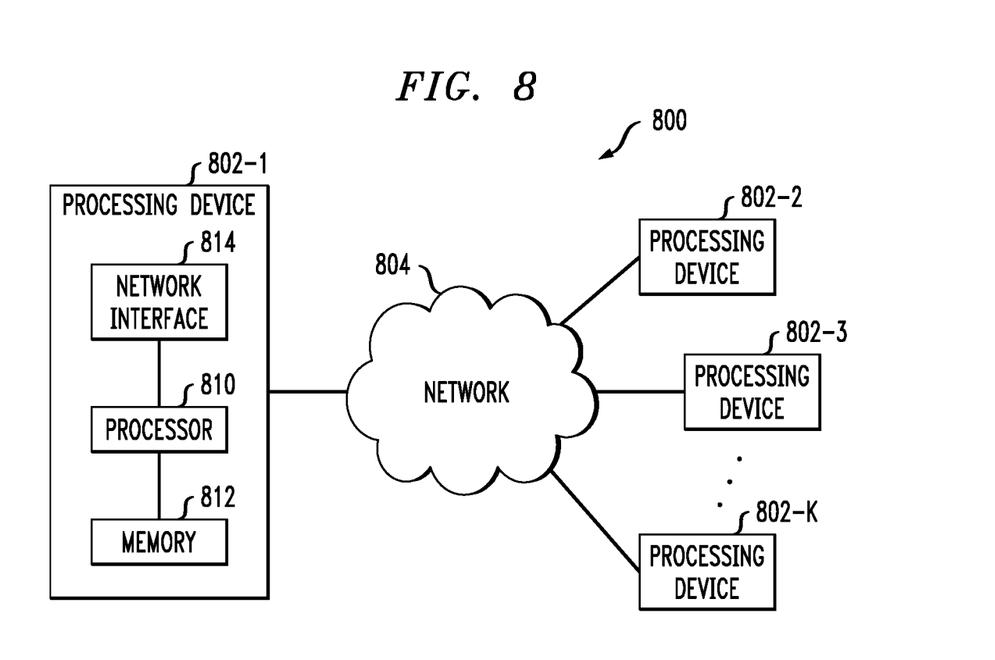

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more information processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a CPU, a GPU, a TPU, a microcontroller, an ASIC, a FPGA or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining one or more items of data, external to an automated robotic system, from a data center environment;
    determining one or more automated operations to be carried out by the automated robotic system within the data center environment by processing at least a portion of the one or more items of data and one or more user-provided commands using at least one artificial intelligence-based inference engine;
    generating one or more instructions related to carrying out the one or more automated operations within the data center environment; and
    performing at least a portion of the one or more automated operations within the data center environment based at least in part on the one or more instructions, wherein performing at least a portion of the one or more automated operations comprises initiating movement of the automated robotic system in accordance with a motion plan generated by the at least one artificial intelligence-based inference engine in connection with (i) determining the one or more automated operations to be carried out within the data center environment and (ii) determining, using the at least one artificial intelligence-based inference engine, one or more movement path recommendations within the data center environment;
    wherein the method is performed by the automated robotic system comprising at least one processing device comprising a processor coupled to a memory.

2. The computer-implemented method of claim 1, wherein determining one or more automated operations to be carried out by the automated robotic system within the data center environment comprises processing at least a portion of the one or more items of data using one or more of at least one single shot detector, one or more simultaneous localization and mapping models, one or more reinforcement learning techniques, at least one proximal policy optimization algorithm, at least one recurrent neural network transducer model, and at least one streaming engine.

3. The computer-implemented method of claim 1, further comprising:
    automatically training the at least one artificial intelligence-based inference engine based at least in part on feedback related to the performed at least a portion of the one or more automated operations within the data center environment.

4. The computer-implemented method of claim 1, further comprising:
    automatically training the at least one artificial intelligence-based inference engine based at least in part on feedback related to one or more automated operations carried out within at least one virtual environment related to the data center environment.

5. The computer-implemented method of claim 1, further comprising:
    automatically training the at least one artificial intelligence-based inference engine based at least in part on data related to one or more automated operations carried out by at least one additional automated robotic system within at least one additional data center environment, wherein the automated robotic system and the at least one additional automated robotic system are connected via at least one robotic system portal.

6. The computer-implemented method of claim 1, wherein obtaining one or more items of data comprises automatically identifying one or more data center components within the data center environment.

7. The computer-implemented method of claim 1, wherein obtaining one or more items of data comprises capturing data from the data center environment using at least one of one or more cameras on the automated robotic system and one or more sensors on the automated robotic system.

8. The computer-implemented method of claim 1, wherein the one or more automated operations to be carried out by the automated robotic system within the data center environment comprise one or more automated operations related to manipulating at least one of one or more servers within the data center environment and one or more server components within the data center environment.

9. The computer-implemented method of claim 1, wherein generating one or more instructions comprises converting data pertaining to the one or more automated operations determined to be carried out by the automated robotic system into one or more electrical signals commands related to one or more physical components of the automated robotic system.

10. The computer-implemented method of claim 1, wherein performing at least a portion of the one or more automated operations comprises implementing one or more arms of the automated robotic system, wherein at least a portion of the one or more arms are one or more of extensible, vertically moveable, horizontally moveable, and engaged using one or more hydraulic components.

11. The computer-implemented method of claim 1, wherein performing at least a portion of the one or more automated operations comprises initiating movement of the automated robotic system by engaging at least one motor of the automated robotic system in conjunction with one or more wheels of the automated robotic system.

12. A non-transitory processor-readable storage medium having stored therein program code of one or more software programs, wherein the program code when executed by at least one processing device causes the at least one processing device:
   to obtain one or more items of data, external to an automated robotic system, from a data center environment;
   to determine one or more automated operations to be carried out by the automated robotic system within the data center environment by processing at least a portion of the one or more items of data and one or more user-provided commands using at least one artificial intelligence-based inference engine;
   to generate one or more instructions related to carrying out the one or more automated operations within the data center environment; and
   to perform at least a portion of the one or more automated operations within the data center environment based at least in part on the one or more instructions, wherein performing at least a portion of the one or more automated operations comprises initiating movement of the automated robotic system in accordance with a motion plan generated by the at least one artificial intelligence-based inference engine in connection with (i) determining the one or more automated operations to be carried out within the data center environment and (ii) determining, using the at least one artificial intelligence-based inference engine, one or more movement path recommendations within the data center environment.

13. The non-transitory processor-readable storage medium of claim 12, wherein determining one or more automated operations to be carried out by the automated robotic system within the data center environment comprises processing at least a portion of the one or more items of data using one or more of at least one single shot detector, one or more simultaneous localization and mapping models, one or more reinforcement learning techniques, at least one proximal policy optimization algorithm, at least one recurrent neural network transducer model, and at least one streaming engine.

14. The non-transitory processor-readable storage medium of claim 12, wherein the program code when executed by the at least one processing device further causes the at least one processing device:
   to automatically train the at least one artificial intelligence-based inference engine based at least in part on feedback related to one or more automated operations carried out within at least one virtual environment related to the data center environment.

15. The non-transitory processor-readable storage medium of claim 12, wherein the program code when executed by the at least one processing device further causes the at least one processing device:
   to automatically train the at least one artificial intelligence-based inference engine based at least in part on data related to one or more automated operations carried out by at least one additional automated robotic system within at least one additional data center environment, wherein the automated robotic system and the at least one additional automated robotic system are connected via at least one robotic system portal.

16. An apparatus comprising:
   at least one processing device comprising a processor coupled to a non-transitory memory;
   the at least one processing device being configured:
      to obtain one or more items of data, external to an automated robotic system, from a data center environment;
      to determine one or more automated operations to be carried out by the automated robotic system within the data center environment by processing at least a portion of the one or more items of data and one or more user-provided commands using at least one artificial intelligence-based inference engine;
      to generate one or more instructions related to carrying out the one or more automated operations within the data center environment; and
      to perform at least a portion of the one or more automated operations within the data center environment based at least in part on the one or more instructions, wherein performing at least a portion of the one or more automated operations comprises initiating movement of the automated robotic system in accordance with a motion plan generated by the at least one artificial intelligence-based inference engine in connection with (i) determining the one or more automated operations to be carried out within the data center environment and (ii) determining, using the at least one artificial intelligence-based inference engine, one or more movement path recommendations within the data center environment.

17. The apparatus of claim 16, wherein determining one or more automated operations to be carried out by the automated robotic system within the data center environment comprises processing at least a portion of the one or more items of data using one or more of at least one single shot detector, one or more simultaneous localization and mapping models, one or more reinforcement learning techniques, at least one proximal policy optimization algorithm, at least one recurrent neural network transducer model, and at least one streaming engine.

18. The apparatus of claim 16, wherein the at least one processing device being further configured:

to automatically train the at least one artificial intelligence-based inference engine based at least in part on feedback related to one or more automated operations carried out within at least one virtual environment related to the data center environment.

19. The apparatus of claim 16, wherein the at least one processing device being further configured:
to automatically train the at least one artificial intelligence-based inference engine based at least in part on data related to one or more automated operations carried out by at least one additional automated robotic system within at least one additional data center environment, wherein the automated robotic system and the at least one additional automated robotic system are connected via at least one robotic system portal.

20. The apparatus of claim 16, wherein generating one or more instructions comprises converting data pertaining to the one or more automated operations determined to be carried out by the automated robotic system into one or more commands related to one or more physical components of the automated robotic system.

\* \* \* \* \*